Patented Aug. 7, 1945

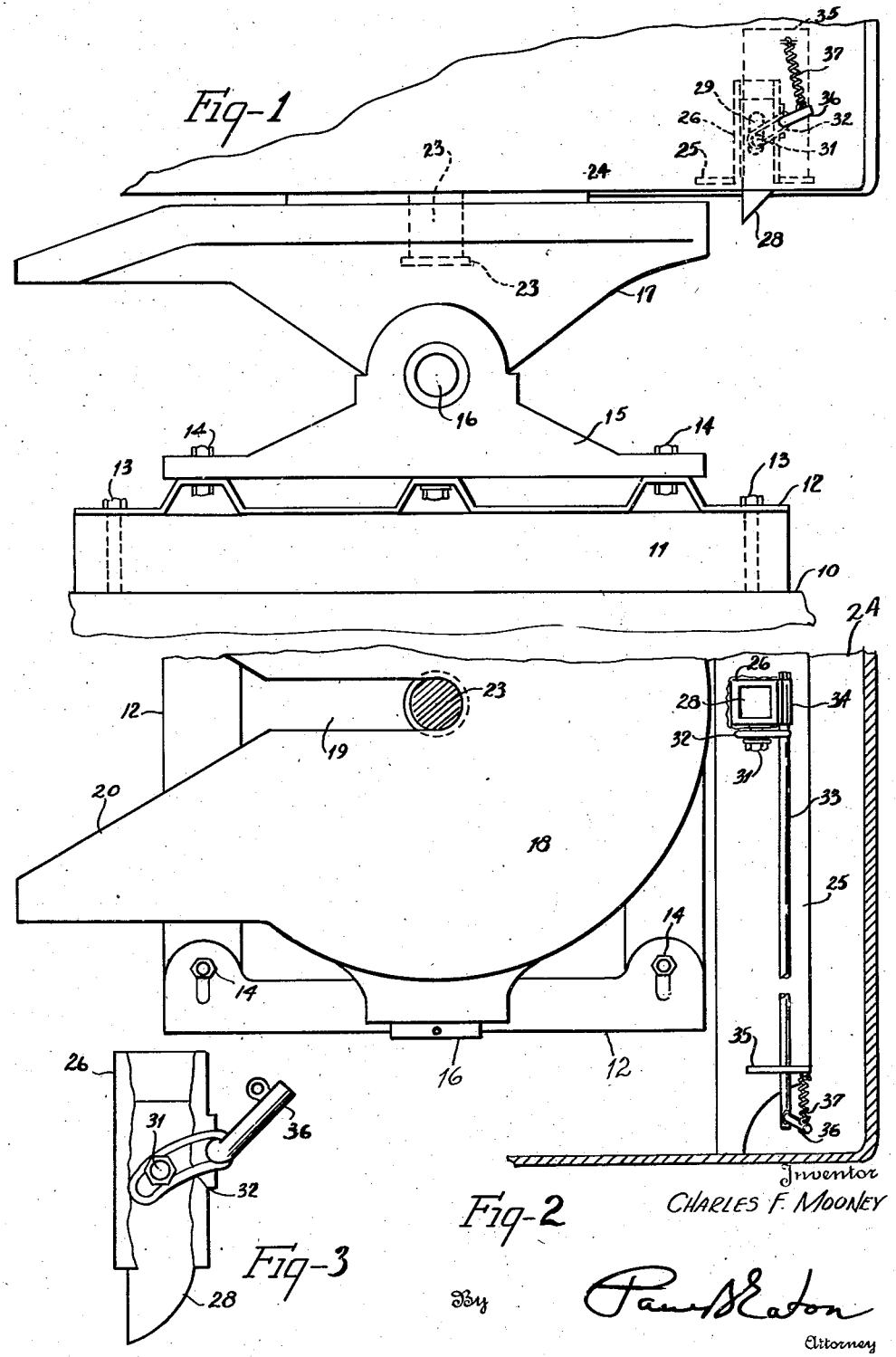

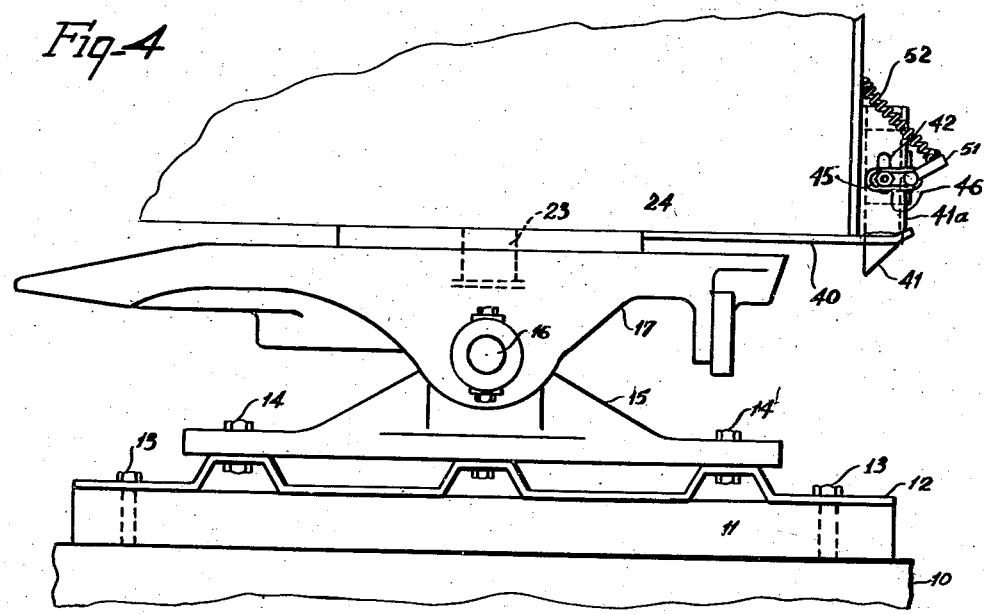
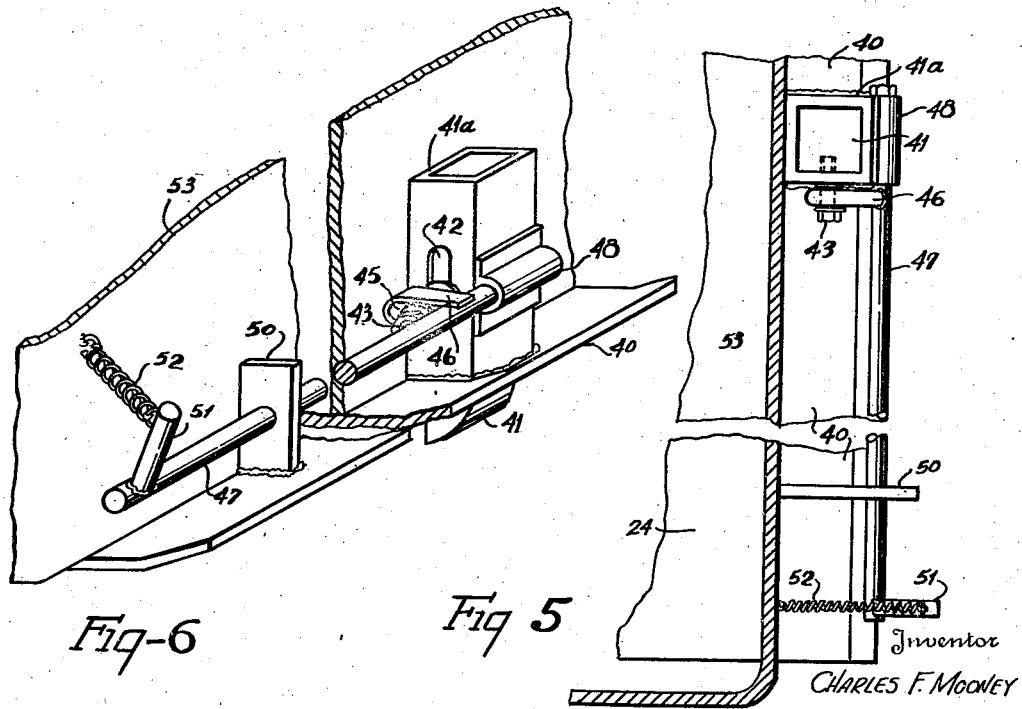

2,381,305

UNITED STATES PATENT OFFICE 2,381,305

SAFETY DEVICE FOR TRAILERS

Charles F. Mooney, Charlotte, N. C., assignor of one-half to John D. Kluttz, Charlotte, N. C.

Application April 24, 1944, Serial No. 532,413

6 Claims. (Cl. 280—33.1)

This invention relates to a safety device for the connection between a tractor and a trailer or a semi-trailer. A semi-trailer has rear wheels which contact the ground and has suitable supporting means such as retractable wheels or other props to be let down to hold the front end of the trailer in elevated position when it is disconnected from the tractor. The tractor has what is called a fifth wheel, and the trailer has a downwardly projecting pin which is adapted to slide into a slot in the fifth wheel and be automatically locked in position when the tractor is backed underneath the front end of the trailer. It often happens that the tractor is backed in with too much force and a rebound occurs which results in the connecting pin on the trailer not being properly locked in the fifth wheel mechanism and when the tractor starts moving forwardly, the trailer is not pulled by the tractor and the trailer slides off of the fifth wheel as the tractor is pulled from beneath the trailer resulting in the front end of the trailer, which is usually heavily loaded, falling onto the ground or pavement and doing material and substantial damage to the trailer.

It is an object of this invention to provide safety means which will prevent the front end of the trailer from disengaging itself from the fifth wheel when failure of the locking mechanism occurs by providing a latch which is normally disposed in a downward position in front of the fifth wheel so that if the downwardly projecting pin on the trailer is not locked by the locking mechanism in the fifth wheel, then this latch will engage the front end of the fifth wheel mechanism and prevent the separation of the tractor and trailer.

Some of the objects of the invention having been stated, other objects will appear as the description proceeds, when taken in connection with the accompanying drawings, in which:

Figure 1 is a side elevation of a portion of the rear end of a tractor and a portion of the front end of a semi-trailer showing the fifth wheel and the connection between the semi-trailer and the tractor;

Figure 2 is a top plan view of the apparatus shown in Figure 1, and omitting the bottom or floor portion of the semi-trailer for sake of clearness;

Figure 3 is an enlarged detail view looking from the lower side of the right-hand corner of Figure 2, and omitting the portions of the trailer to which the apparatus is attached, and showing a portion of the latch casing broken away;

Figure 4 is a view similar to Figure 1, but showing the latching mechanism mounted on the exterior of the semi-trailer;

Figure 5 is a top plan view with parts in section of the right-hand portion of Figure 4;

Figure 6 is an isometric view looking at the front end of the semi-trailer and showing portions thereof broken away.

Referring more specifically to the drawings, the numeral 10 indicates the rear portion of a tractor which on each side thereof usually has a pair of rails 11 having a flange portion 12, rails 11 being disposed on each side of the framework of the tractor, and each of the rails is secured to the framework of the trailer by any suitable means such as bolts 13.

Bolted on the rails 11 and spanning the distance therebetween by any suitable means such as bolts 14 is a casting 15 having a transversely disposed shaft 16 mounted therein, and this shaft 16 is pivotally mounted at each of its ends in the members 15.

Fixedly secured on the shaft 16 is a fifth wheel member 17 which has a flat upper surface 18 and has a slot 19 therein which is divergent as at 20 at its rear end for receiving the coupling pin 23 secured to and projecting downwardly from the semi-trailer 24.

The semi-trailer 24 is of conventional structure and in one form, as shown in Figure 2, has a transverse member 25. This transverse member 25 has a suitable hole cut therein in which a casing 26 is welded. Casing 26 has slidably mounted therein a latch or plunger 28, and one side of the casing has a vertically disposed slot 29 therein through which projects a pin 31. Surrounding the pin 31 is a slotted member 32 which is fixedly secured at one end to a rod 33 which is rotatably mounted as at 34 on the front side of the casing 26 and is also rotatably mounted in a suitable upstanding member 35 and has a crank 36 thereon. If desired, a tension spring 37 can be secured to this crank and to the member 35 to hold the latch normally in downward position.

This insures that unless the crank 36 is seized by an operator and the shaft 33 rotated to raise the latch 28, that the latch 28 will always be disposed in front of the member 17 and will prevent disengagement of the pin 23 from the fifth wheel member 17 even though the automatic locking mechanism, not shown, fails to lock the pin 23 in position.

In Figures 4, 5, and 6, a slightly modified form of the invention is shown in which like reference characters indicate like parts, but in this form instead of placing the latching means on the inside of the semi-trailer, a suitable plate 40 is provided, and the casing 41a is welded thereto and a suitable hole is provided in the plate 40 through which the plunger 41 projects so that it will be in front of the fifth wheel member 17.

Casing 41a has a slot 42 therein, and a laterally projecting pin 43 similar to pin 31 projects through the slot 42 and then the pin 43 projects through a slot 45 in a crank arm 46 which is integral with rod 47 rotatably mounted as at 48 at one end on the exterior of the casing 41a and having an intermediate portion thereof, rotatably mounted in an upstanding lug 50.

Rod 47 has a crank 51 thereon, and a tension spring 52 is connected thereto at one end, and the other end is connected to the front wall 53 of the semi-trailer.

It is thus seen that in both forms of the invention, there is a latch 41 disposed down in the path of travel of the trailer body, and will prevent the trailer from moving rearwardly of the fifth wheel when it fails to become locked in the fifth wheel mechanism. When it is desired to disconnect the trailer and tractor, an operator manually raises the latch by seizing the crank 36 or 51 and raises the latch out of the path of the fifth wheel.

In the drawings and specification, there has been set forth a preferred embodiment of the invention and although specific terms are employed, they are used in a generic and descriptive sense only and not for purposes of limitation, the scope of the invention being defined in the claims.

I claim:

1. In a tractor and trailer, the tractor having a fifth wheel on which the front end of a trailer is adapted to rest, a downwardly projecting latch mounted on the front portion of the trailer and having its lower end normally occupying a position in front of the fifth wheel of the trailer when the tractor and trailer are coupled together to prevent disengagement of the trailer from the fifth wheel and means for moving the latch upwardly to remove the lower end thereof from in front of the fifth wheel.

2. In a tractor having a fifth wheel on the rear end thereof and provided with means for receiving, a downwardly projecting pin mounted on the front end of a trailer, a downwardly projecting latch mounted on the trailer and whose lower end is normally disposed in front of the fifth wheel when the tractor and trailer are coupled together to prevent the tractor and its fifth wheel being pulled from beneath the front end of the trailer, and means for moving the lower end of the latch upwardly out of the path traveled by the fifth wheel when the fifth wheel moves forwardly relative to the trailer.

3. In a tractor and trailer combination, the tractor being equipped with a fifth wheel having a rearwardly opening slot therein into which a downwardly projecting pin on the trailer is adapted to move when the tractor is backed beneath the trailer, and a downwardly projecting latch mounted on the trailer and adapted to project downwardly in front of the fifth wheel when the tractor and trailer are coupled together to prevent movement of the fifth wheel forwardly from beneath the trailer, the front portion of the lower end of the latch being sloped downwardly and rearwardly to allow it to be raised by the fifth wheel when the tractor is backed beneath the trailer, and means for normally urging the latch downwardly to a position in front of the front edge of the fifth wheel.

4. In a tractor and trailer, the tractor having a fifth wheel and the trailer having a downwardly projecting pin adapted to fit into the fifth wheel, a downwardly projecting latch mounted on the front portion of the trailer and normally occupying a position in front of the fifth wheel of the trailer to prevent disengagement of the trailer from the fifth wheel, the lower end of the latch being sloped downwardly and rearwardly to cause it to ride onto the upper surface of the fifth wheel when the tractor is backed beneath the front end of the trailer.

5. In a tractor having a fifth wheel on the rear end thereof, a downwardly projecting latch mounted on the trailer and whose lower end is normally disposed in front of the fifth wheel to prevent the tractor and its fifth wheel being pulled from beneath the front end of the trailer, the lower end of the latch being sloped downwardly and rearwardly to cause it to ride onto the upper surface of the fifth wheel and occupy a position in front of the fifth wheel when the tractor is backed beneath the front end of the trailer.

6. In a tractor having a fifth wheel on the rear end thereof, provided with means for receiving a downwardly projecting latch mounted on the trailer and whose lower end is normally disposed in front of the fifth wheel when the tractor and trailer are coupled together to prevent the tractor and its fifth wheel being pulled from beneath the front end of the trailer, manually operated means connected to the latch for raising the same upwardly out of the path of the fifth wheel when it is desired to disconnect the tractor and trailer, the lower end of the latch being sloped downwardly and rearwardly to cause it to ride onto the upper surface of the fifth wheel when the tractor is backed beneath the front end of the trailer.

CHARLES F. MOONEY.